United States Patent
Itoh et al.

(10) Patent No.: US 6,282,293 B1
(45) Date of Patent: *Aug. 28, 2001

(54) SYSTEM AND METHOD FOR CHARGING FEE FOR VIDEO INFORMATION

(75) Inventors: Shigeyuki Itoh, Kawasaki; Iwao Aizawa, Yokohama, both of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/539,163

(22) Filed: Oct. 4, 1995

(30) Foreign Application Priority Data

Oct. 4, 1994 (JP) .................................................. 6-240090

(51) Int. Cl.[7] .................................................. H04N 7/167
(52) U.S. Cl. ........................ 380/233; 380/201; 380/231; 380/232
(58) Field of Search .................................. 380/5, 16, 20, 380/231, 232, 233, 201, 202; 348/3; 455/2

(56) References Cited

U.S. PATENT DOCUMENTS

| | | | |
|---|---|---|---|
| 4,484,217 | * 11/1984 | Block et al. | |
| 4,635,112 | * 1/1987 | Tomioka et al. | |
| 4,635,113 | * 1/1987 | Okada et al. | |
| 4,796,297 | * 1/1989 | Okamoto | 380/16 |
| 4,823,385 | * 4/1989 | Hegendorfer | 380/20 |
| 5,144,663 | * 9/1992 | Kudelski et al. | |
| 5,345,505 | * 9/1994 | Pires | |
| 5,461,674 | * 10/1995 | Citta | 380/20 |

FOREIGN PATENT DOCUMENTS 7-123394    5/1995   (JP) .

* cited by examiner

*Primary Examiner*—Stephen C. Buczinski
(74) *Attorney, Agent, or Firm*—Antonelli, Terry, Stout & Kraus, LLP

(57) ABSTRACT

In a fee charging system for video information, scramble signals including video information and charging information can be recorded on a recording media such that the signals are read later therefrom. The recording of the scramble signals is free of charge. In an operation to reproduce original unscrambled video signals from the signals read from the media by a recording and reproducing apparatus, the charging information is detected to conduct a charging process. Consequently, although the scrambled signals may be freely copied onto another recording media, the charging process is executed for each copying operation. First charging information and second charging information other than the first charging information are arranged with the video information. The video information includes first video information as main video information and second video information. The first charging information is added to the first video information, whereas the second charging information is added to the second video information. A charging process is executed by a charge processing unit according to the charging information. When the second charging information is detected, the charging process is accomplished according to the second charging information in the charge processing unit.

73 Claims, 9 Drawing Sheets

WITHOUT COMMERCIAL INFORMATION

WITH COMMERCIAL INFORMATION

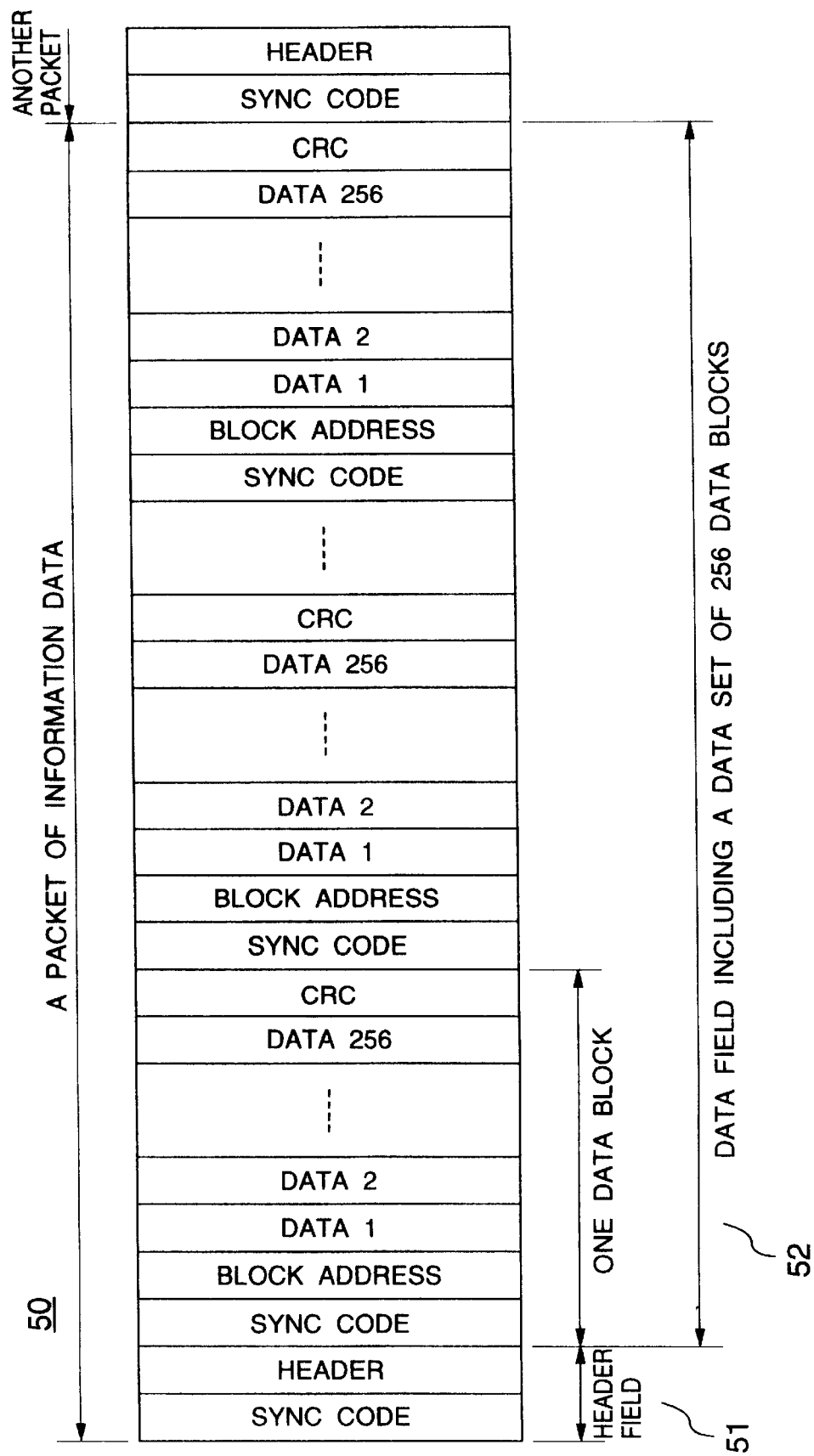

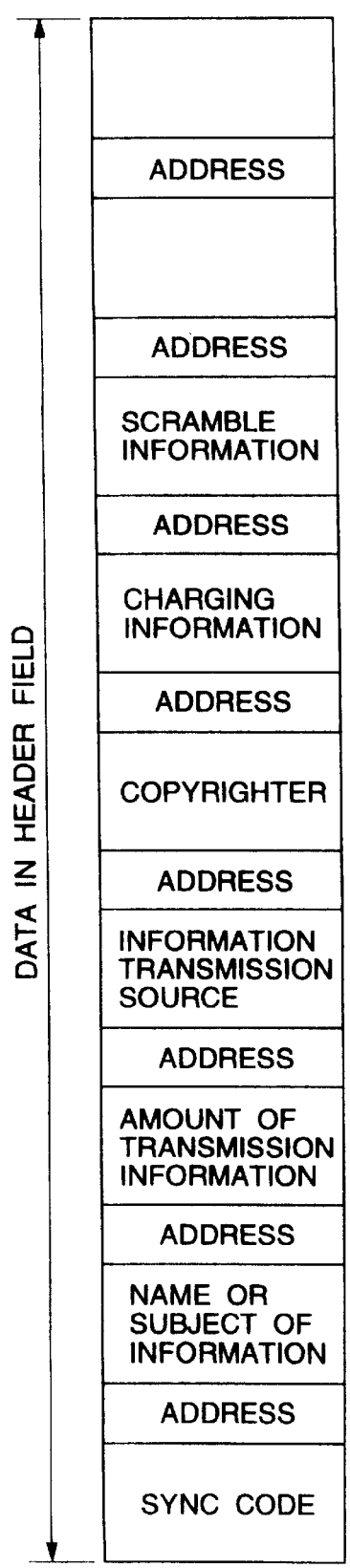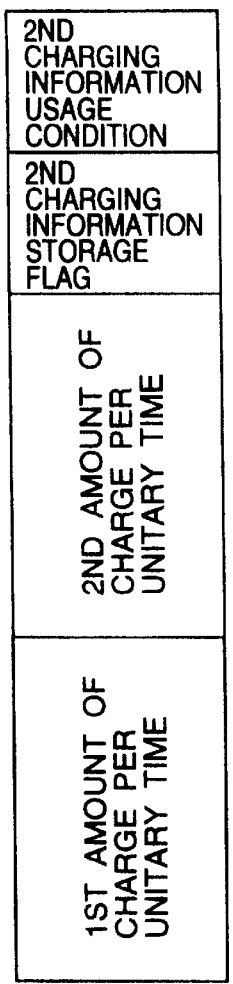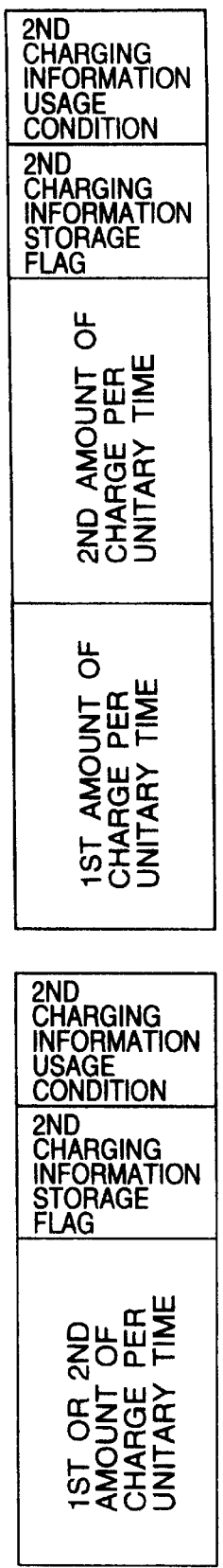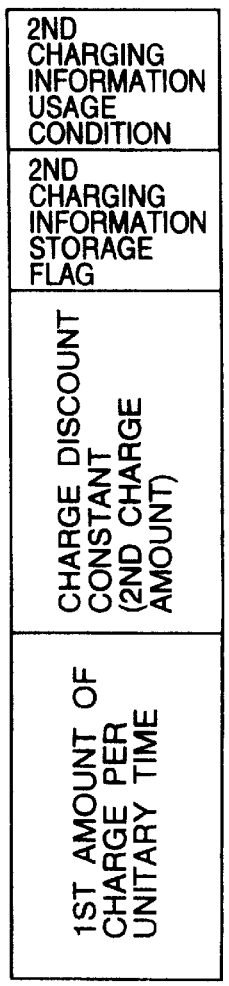

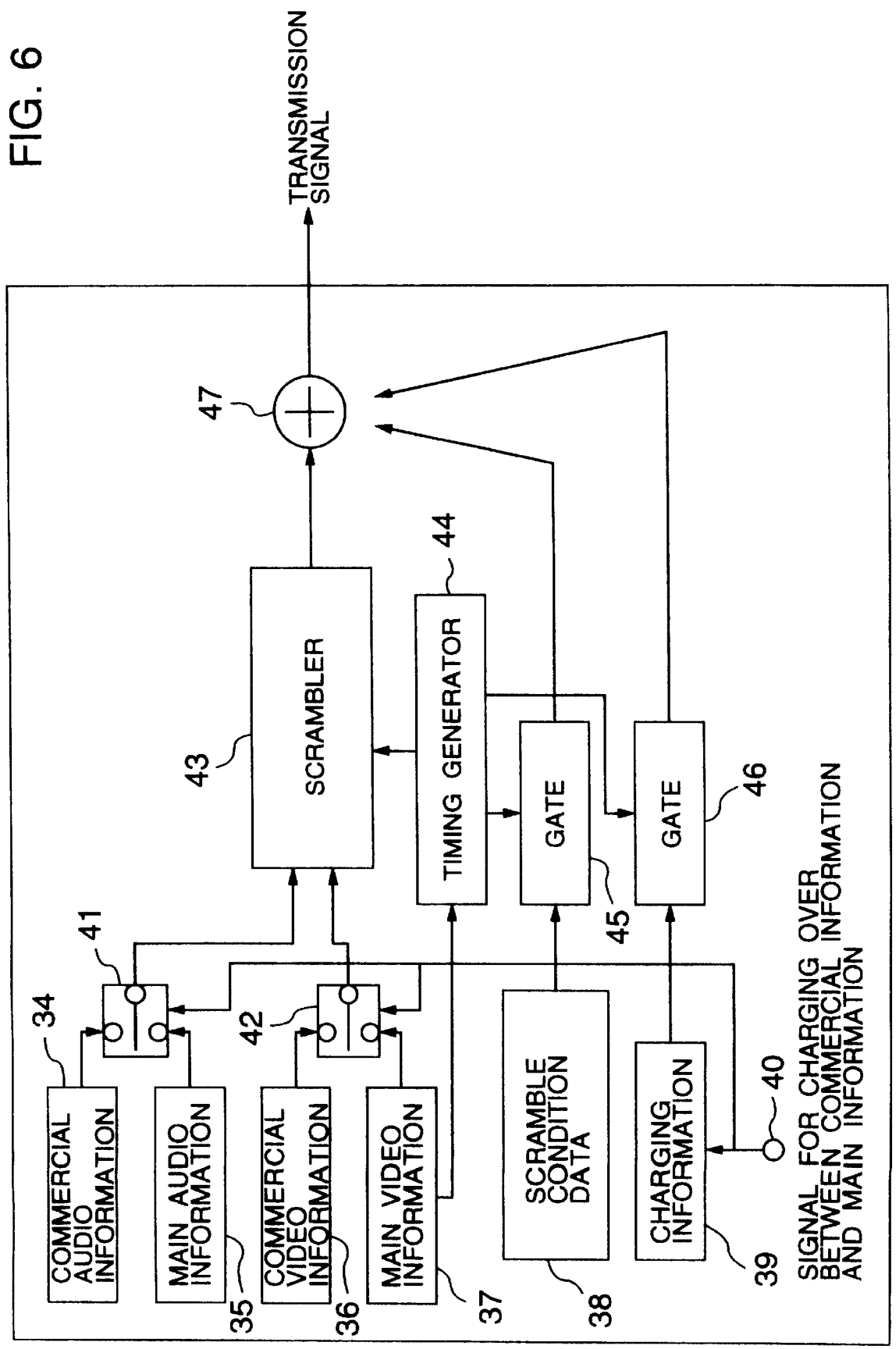

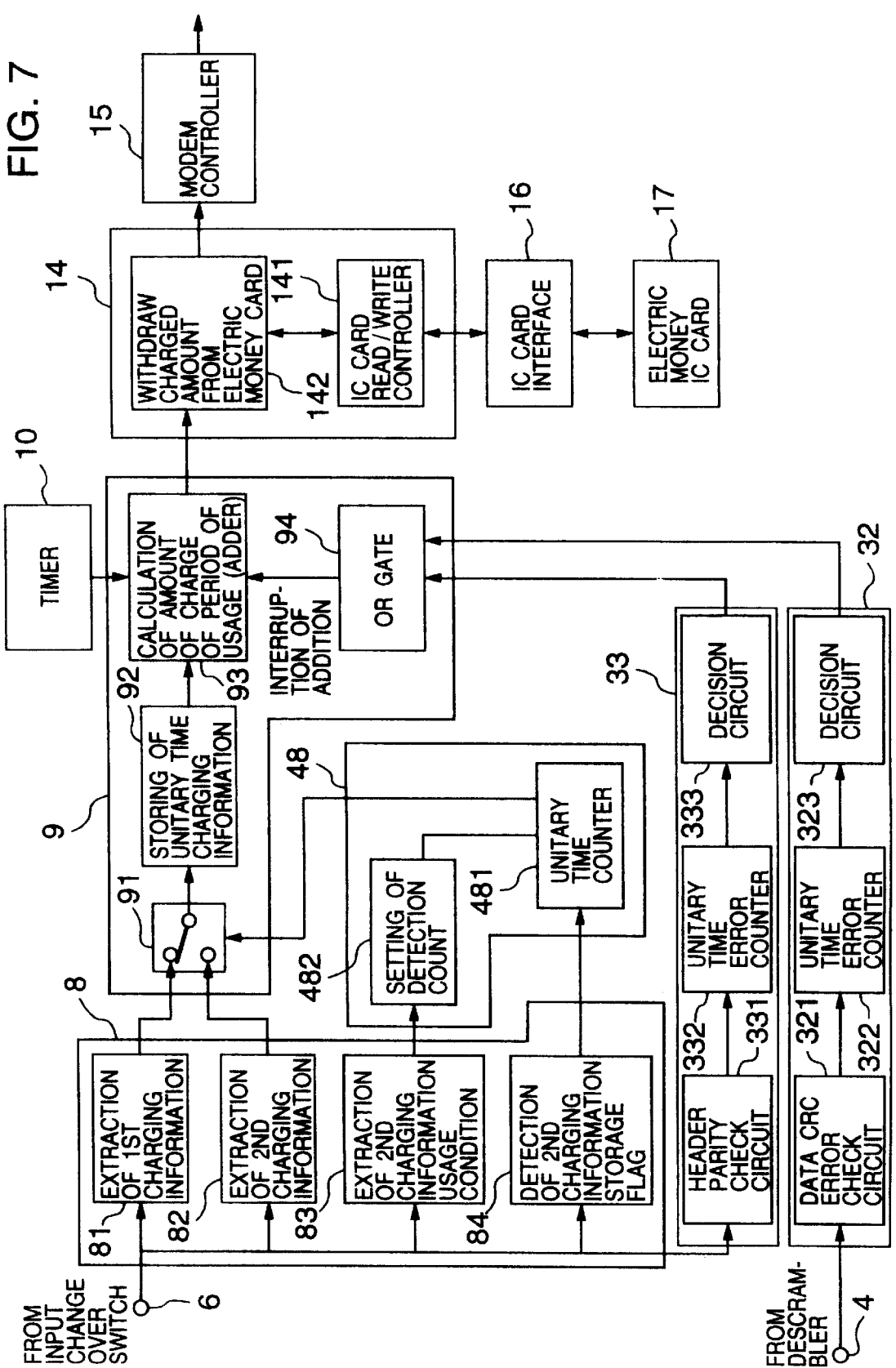

SYSTEM AND METHOD FOR CHARGING FEE FOR VIDEO INFORMATION

BACKGROUND OF THE INVENTION

The present invention relates to a fee charging system for use in cases in which information such as video information is supplied for pay via a satellite broadcasting system, a community antenna television (CATV) system, a video cassette tape, or an optical disk and, in particular, to a charging system and a charging method for use in cases in which particular information such as information of commercial messages is simultaneously supplied as a portion of, for example, video information.

Conventionally, when information including video information is supplied via a CATV system or the like, if such particular information as information of commercials is not supplied together with video information in pay-television systems, for example, of the Nippon Hoso Kyokai (NHK) (Japan Broadcasting Corporation) and WOWOW (one of the broadcasting satellite services in Japan), the subscribers of such television broadcasting systems are uniformly charged for the received video information for each predetermined period of time. With the income, the broadcasting organizations conduct operations to supply various programs to the users. Furthermore, even when information is supplied to subscribers for pay via a video-cassette tape or an optical disk, for example, in a rental system, the particular information such as commercial information is not supplied together with video information. Namely, the amount of charge is decided for each program (for each videocassette tape or optical disk). In contrast therewith, for example, in a commercial broadcasting system using ground waves, the particular information including commercial information is supplied together with video information. That is, since such a broadcasting or so-called video information system is operated to serve the video information on the income from sponsors of the information, the viewers can obtain information free of charge.

Charging systems for pay-television broadcasting system have been described, in for example Japanese Patent Applications Un-examined Publication Nos. JP-A-5-95296 and JP-A-3-147490.

In the charging system of conventional pay-television broadcasting and pay information media, the charging operation is accomplished when transmitted digital video information is received and reproduced. The scrambled state of signals is thereafter descrambled. Alternatively, after an amount of charge is paid in advance, the digital video information is supplied to the pertinent user. Once the digital video information supplied to a user is descrambled as above, the information can be, in principle, arbitrarily recorded to produce copies thereof as many times as desired.

If the copying of digital information is allowed without limitation, it will be against copyrighter's interests. Moreover, this leads to decrease in the income of the supplier of video information. Additionally, when the amount of charge for information is determined the assumption of an arbitrary number of copies are to be made of the information on the user side, the amount of charge will be undesirably increased.

It is predictable that development and advance in multimedia will enhance expansion in utilization of video-on-demand services and CATV systems. Video-on-demand has a remarkable merit or feature in that necessary video information can be arbitrarily attained at a desired point of time. However, there is no room for particular information such as information of a commercial message. As a result, the cost of equipment as well as the maintaining cost necessary to supply services including the video-on-demand service are reflected in the amount of charge to be paid for the acquisition of video information. This therefore hinders a low-cost supply of video information.

Furthermore, in a commercial broadcasting system using ground waves, since commercial messages broadcasted during programs interrupt the stream of each program, the effect or quality of programs such as an entertaining feature thereof is deteriorated.

SUMMARY OF THE INVENTION

It is therefore an object of the present invention to provide a fee charging system for a video information and a method for charging fees for a video information taking advantage of a feature of digital information that the quality thereof is rarely deteriorated even when the information is copied, so that video information is supplied to users at a low price while protecting the copyright of supplied information.

In an embodiment of a fee charging system for a video information according to the present invention, a scrambled signal in which video information is mixed with charging information can be recorded on a recording media so as to be later read therefrom. The charging operation may not be necessarily conducted for the recording, namely, copying of the scrambled signal. In consequence, the viewer or user is allowed to copy free of charge the scrambled signal including the video information and charging information an arbitrarily desired number of times. When a signal read from the recording media by a recording and reproducing apparatus is descrambled to attain the original signal for reproduction thereof, the charging information is detected in the obtained signal so as to carry out a charging process according to the charging information. Consequently, although the scrambled signal may be arbitrarily copied onto any recording media, the charging operation is accomplished each time the signal is descrambled for reproduction thereof.

Since the fee charging for the usage of video information is conducted for each reproduction thereof, the utilization fee of the information is appropriately paid to the author thereof. In consequence, when a copy of information produced by a first user is passed to a second user and the second user copies the obtained information again, the charging operation is also achieved for the copy of the second user. It is hence possible to lower the utilization fee of information which will be more frequently copied. Information is, in one hand, directly supplied to users via such media as a video tape and a laser disk. On the other hand, the copying of the information on the viewer or user side possibly increases the number of users of the information and hence the utilization fee thereof can be decreased. Additionally, the conventional system in which the charging operation is effected for copies of information or the amount of charge is paid before the signal is descrambled depresses or lowers the customers' interest in purchasing video information. In contrast therewith, according to a charging system in which the scrambled information is allowed to be arbitrarily copied in accordance with the present invention, when the user once attains video information, there will be more chances in which the information is copied for other purposes. Namely, the video information will be utilized in a broader range of viewers.

When commercials (i.e., advertisements) are added to the main video information, an amount of charge for the commercial messages (i.e., advertisements information) is obtained from the sponsor, which makes it possible to reduce the utilization fee of video information. To achieve the object of the present invention to supply video information at a possibly low cost, the video information includes, according to another embodiment of the present invention, first charging information and second charging information different from the first charging information. In this regard, the video information includes, for example, first video information as the main video information, such as a movie or a show, and second video information of commercials or the like. The first charging information is added to the first video information, whereas the second charging information is added to the second video information. A charge processing unit carries out a charging process according to the charging information. When the second charging information is detected, the charge processing unit executes the charging operation according to the second charging information.

For viewers who desire to skip commercial messages, it is possible to suppress the reproduction of commercial information. For viewers who desire to reproduce only the main video information, namely, first video information, the amount of charge is decided according to the first charging information. For the users who reproduce the first video information as well as the second video information, namely, commercial messages, the charging operation is effected according to the second charging operation. The amount of charge thus determined is different from that derived from the first charging information. According to the second charging information, it may be specified that the pertinent viewer can use video information free of charge or the amount of charge to be decided by the second charging information is lower than that computed according to the first charging information.

Moreover, the charging system according to the present invention has the following operational aspects.

1. When particular information such as information of commercials is supplied together with video information from the program supplying side, there may be employed predetermined conditions for the particular information. When one of the conditions is satisfied, for example, when commercial messages are viewed for at least a preset period of time, a particular charge can be set to the video information, for example, a reduced amount of charge is applied thereto or the information is supplied free of charge.

2. Also for copied information, a charging process can be carried out while protecting, for example, the copyright of the information.

3. The charging operation can be achieved with an integrated circuit (IC) card storing therein electronic money. As a result, it is unnecessary to use such operations conventionally required when the charging operation is carried out with a credit card, such as a credit check for creditability of the user and the post-operation for settlement of the pertinent account. Moreover, the unfavorable situation in which the charged amount is left unsettled can be avoided, and the IC card may also be utilized.

4. Recognizing the quantity of errors in input signals, the charging process can be accomplished according to the quality of input signals. For example, when the amount of errors exceeds a preset value, the users are not charged for information acquired.

5. The setting of the particular charge for acquisition of video information is carried out according to recognizing an event that the obtained number of particular charging information items exceeds a predetermined value or according to detection of the particular charge items distributively arranged in the portion of commercial signals. In consequence, the particular charge is applied only to a case in which particular information such as information of commercials is viewed for at least a preset period of time, and hence the commercial effect is affirmatively enhanced.

Still further objects and advantages of the present invention will become apparent to those of ordinary skill in the art upon reading and understanding the following detailed description of the preferred and alternative embodiments.

BRIEF DESCRIPTION OF THE DRAWINGS

FIG. 3 is a diagram showing in detail the format of transmission signals including charging information;

FIG. 4 is a diagram showing an example of the format of a header field of transmission signals including charging information;

FIGS. 5A to 5C are diagrams showing examples of configurations of the contents of charging information;

FIG. 6 is a block diagram showing structure of an apparatus in which charging information is added to video information to generate transmission signals to be outputted therefrom;

FIG. 7 is a block diagram specifically showing constitution of respective circuits of FIG. 1;

DESCRIPTION OF THE PREFERRED EMBODIMENTS

Referring now to the accompanying drawings, description will be given of an embodiment of a fee charging system for video information according to the present information.

Figure 1:
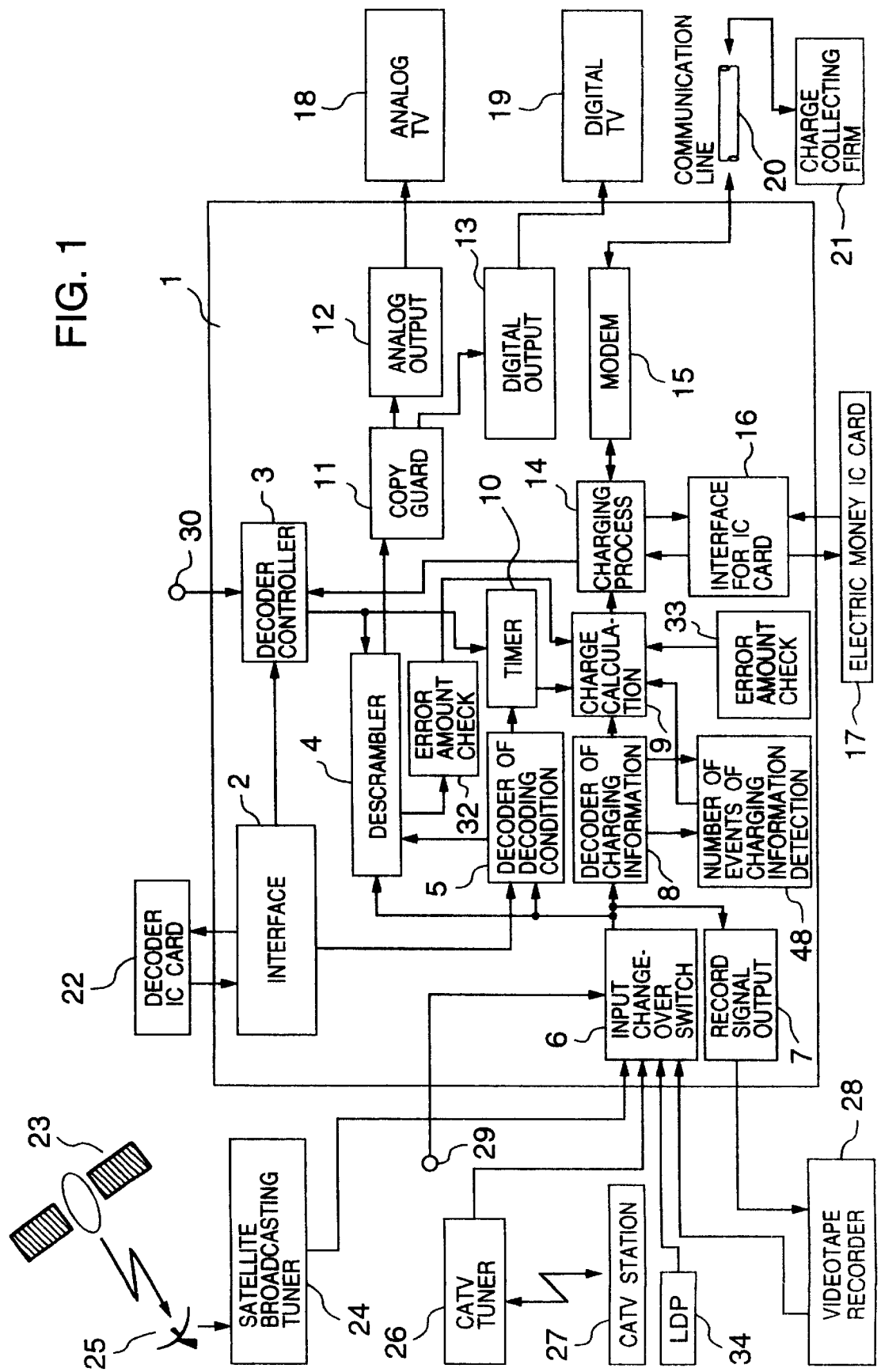
FIG. 1 is a block diagram showing the configuration of an embodiment of a fee charging system for a video information according to the present invention.

FIG. 1 shows in a block diagram an embodiment of a fee charging system for video information according to the present information. In the system of FIG. 1, a satellite broadcasting facility, a CATV system, a laser disk, or a video tape is employed as the video information supplying media. An apparatus in which scrambled video information is received from the media so as to reproduce original video information thereof is used on, for example, a display and is hence called a set-top box. The set-top box might, for example, only include a decoder section 1 of FIG. 1 or may include tuners 24 and 26 for receiving broadcasted waves, a laser disk player 34, a videotape recorder 28, as well as the decoder section 1 depending on cases.

The decoder section 1 of the set-top box includes an identification (ID) card interface 2 for supplying a decoder with information such as a decode condition, approval of decoding, and an ID number of the user. The interface 2 senses and reports therefrom an event that a decoder IC card 22 is installed in the decoder. The decoder section 1 also includes decoder control circuit 3 for controlling operation of the decoder according to whether or not the IC card is in the decoder and a control input signal supplied from an input terminal 30, a descrambler 4 to restore scrambled information to the original form, a circuit 5 for interpreting or decoding a decode condition, an input change-over switch (SW) 6, a record signal output circuit 7 for recording video information and other information on a videotape recorder or the like, a circuit 8 for decoding charging information, a charge calculating circuit 9 for calculating an amount of charge, a timer 10 for measuring a period of charging time, a copy guard circuit 11 for additionally providing copy preventive information, an analog signal output circuit 12, a digital signal output circuit 13, a charging circuit 14 for settling the charged amount with an IC card 17 storing therein electronic money and conducting remittance of the settled amount, a modem circuit 15 for communicating information of remittance, an interface 16 for the IC card 17 storing therein electronic money, an error amount check circuit 32 for checking the quantity of errors detected by the descrambler 4, a charging information error amount check circuit 33 for inspecting the amount of errors detected in the charging information by the charging information decoding circuit 8, and a charging information detection count circuit 48 for recognizing that charging information is detected exceeding a preset number of times according to the number of events of charging information detection from the charging information decoding circuit 8 and the charging information detection signal.

In addition, the input change-over switch 6 is connected to a tuner 24 for receiving a satellite broadcasting signal, a tuner 26 for receiving a CATV signal, a videotape recorder 28 for recording and reproducing analog and digital signals, an input change-over signal terminal 29 for controlling the input change-over switch 6, and an apparatus (LDP) for reproducing information on an optical disk 34. The satellite broadcasting tuner 24 is connected to a satellite broadcasting antenna 25 for receiving signals sent from a broadcasting satellite 23, whereas the CATV tuner 26 receives signals via a communication line 20 from a CATV broadcasting station or repeating station 27. In this regard, the input change-over switch 6 has an input terminal, which may be connected to a computer network, not shown, such that video information is supplied from the network to the input terminal.

The decoder controller 3 is connected to an operation start signal terminal 30 for receiving a signal to activate the controller 3.

The analog signal output circuit 12 is linked with an analog television set (TV) 13 for receiving analog signals. The digital signal output circuit 13 is connected to a digital TV 19 for receiving digital signals. The modem circuit 15 is arranged between a charge collecting firm for settling the remitted amount of charge and the communication line 20.

The input change-over switch 6 conducts a change-over operation to select either one of the signals from the satellite broadcasting tuner 24, CATV tuner 26, LDP 34, and videotape recorder 28. The selected signal is fed to the descrambler 4, decode condition decoder 5, charge information decoder 8, and record signal output circuit 7.

Figure 2A:
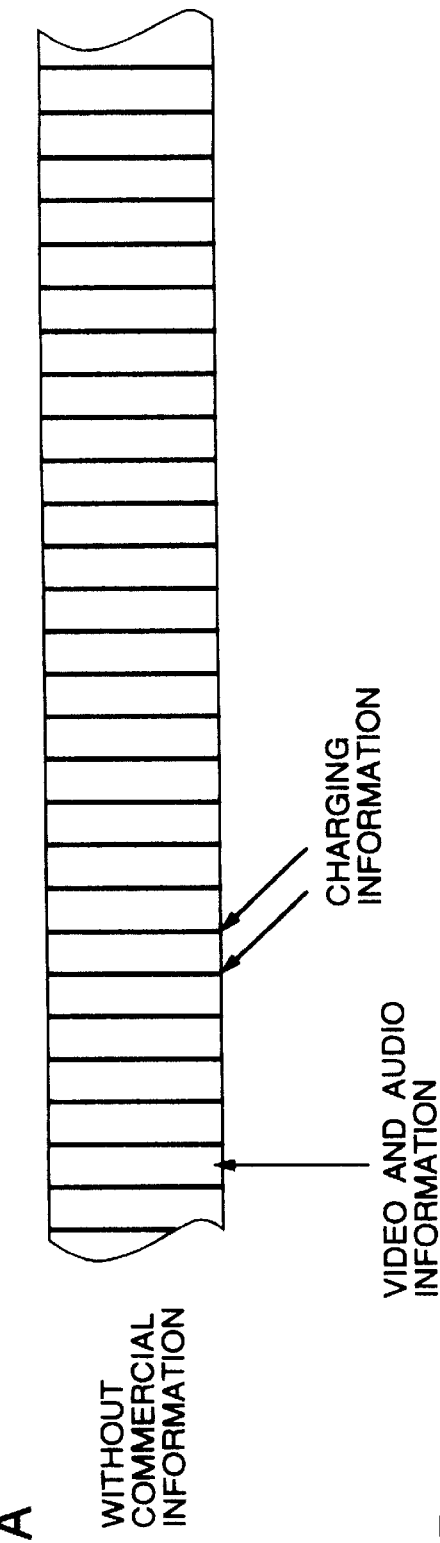
FIG. 2A is a diagram showing an example of transmission signals in which charging information is added to video information not including commercial information.
Figure 2B:
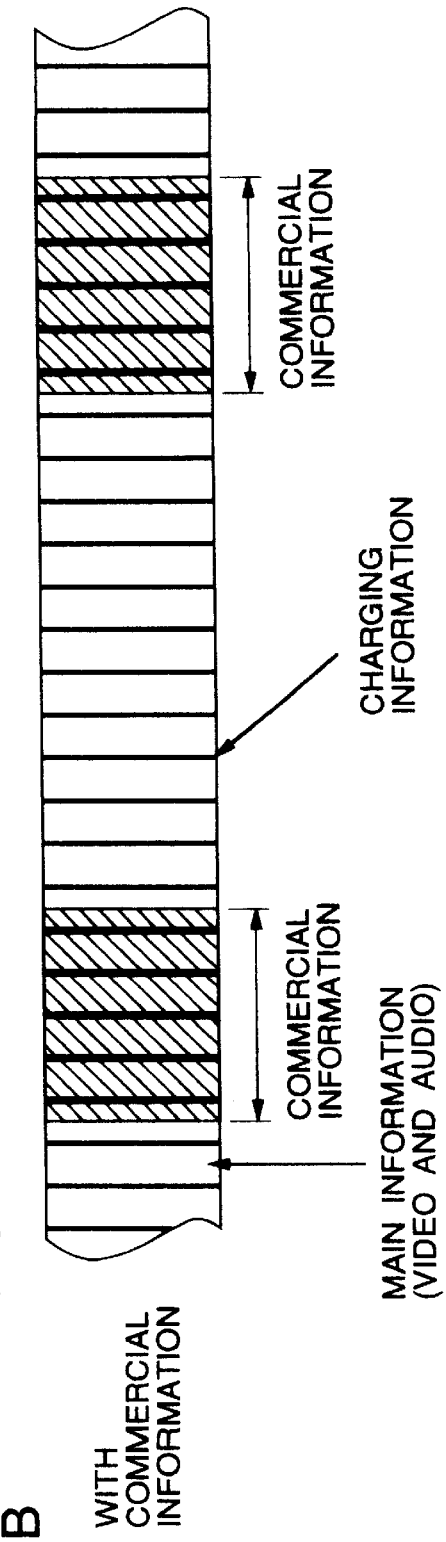
FIG. 2B is a diagram showing an example of transmission signals in which first and second charging information items are added respectively to the main video information and commercial information.

Referring next to FIGS. 1, 2A, and 2B, a description will be given of operation of the set-top box in the embodiment.

In the decode condition decoder 5, the received signal is decoded to obtain information about the signal scrambling operation and then a decode condition is delivered to the descrambler 4 according to information including a decode condition, decode approval, and identification (ID) number of the user obtained from the decoder IC card. Moreover, the decoder 5 send to the timer 10 a report that the decode condition has been sent to the descrambler 4.

In the descrambler 4, according to the decode condition received from the decode condition decoder 5, there is set a condition of releasing the scrambled state and then the input signal is descrambled to restore the original signal. Additionally, in the descrambler 4, the amount of errors caused in the input signal due to a poor condition of electromagnetic wave propagation, damages on the recording media, and the like are detected to be outputted to an error amount check circuit 32. In this connection, the operation of the descrambler 4 is activated by a signal produced from the decoder controller 3, the signal being outputted in response to an insertion signal which indicates insertion of a decoder IC card in the decoder 1 and which is sent from the IC card interface 2 and a signal which indicates that the decode operation is on and which is transmitted from a control input terminal 30. Detection of errors and a decision of the amount thereof as well as the method of detecting errors and the method of deciding the amount thereof can be achieved according to the conventional technique.

The original signal thus restored by the descrambler 4 is fed to the copy guard circuit 11 in which a copy guard signal is added thereto. The obtained signal is then delivered to the analog output circuit 12 to be transformed into an analog signal, which is outputted to the analog TV 18. On the other hand, the signal is fed to the digital output circuit 13 to be converted in conformity with a digital interface specification so as to be fed to the digital TV. In the charging information decoder 8, charging information is extracted from the received signal and is then outputted to the charge calculating circuit 9.

FIGS. 2A and 2B shows examples of transmission signals including video information to which charging information is added. The charging information includes first charging information employed when the user views only the main video information related to, for example, video images of a film or a show and second charging information utilized when information of commercial video images is viewed together with the main video information for a predetermined period of time (or a predetermined number of times). Incidentally, the video information ordinarily includes voice or audio information.

FIG. 2A shows the format of transmission signals including only the main video information. Namely, there is no commercial video and voice information in this signal. In the diagram, the first charging information is designated by bold lines and the main video information is denoted by open portions enclosed with bold lines. The first charging information is added to the main video information at a fixed interval of time.

FIG. 2B shows the signal layout of transmission signals in which particular information associated with commercials is added to the main video information. In the diagram, the regions of commercial video and voice information are indicated by hatched portions. The second charging information (designated by the thickest lines) is arranged in the commercial information region at a fixed interval of time. The second charging information includes information that the amount of charge is reduced or the information is supplied free of charge.

FIG. 3 shows a detailed example of transmission signals of FIG. 2A or 2B. Signals 50 to be transmitted (or reproduced) constitute one information packet including a header field 51 and a data field 52 including 256 data blocks as shown in FIG. 3. A plurality of information packets are transmitted in sequence via a satellite or CATV facility to a set-top box. The header field 51 includes a synchronization (sync) signal and a header. As shown in FIG. 4, the header includes information items such as an address, an information name (title), an amount of information, an information transmission source, a copyrighter, first or second charging information, and a scramble condition. Each data block includes a sync signal, a block address, 256 data areas, and an error correction signal or cyclic redundancy check (CRC) signal. The main video information or commercial information is scrambled together with information of the data areas to resultantly produce a scrambled digital signal.

FIGS. 5A to 5C show in detail the charging information in the header field 51.

FIG. 5A includes a charge data area indicating the first or second charging amount per unitary (reproduction) time, a flag indicating presence of second charging information, and an area denoting a condition for usage of second charging information. The condition of the second charging condition need only be, for example, a predetermined plural number of times of detection of the second charging information flag. That is, to reproduce transmission signals in the set-top box, the second charging information is employed when the number of detection of the second charging information flag becomes equal to the required number of times specified in the condition area. When the flag is not detected or the number of detection times is less than the required number of times, the charging process is carried out with the first charging information.

FIG. 5B includes charge data areas respectively indicating therein the first and second charge amounts per unitary time, a flag denoting presence of second charging information, and an area indicating a condition for use of second charging information. The charging condition of FIG. 5B is the same as that of FIG. 5A.

FIG. 5C includes a charge data area for indicating therein the first charge amount per unitary time, a charge data area in which a reduction constant applied to the amount of first charging information is indicated as second charging information, a flag designating existence of second charging information, and an area indicating a condition of utilization of second charging information. As the reduction constant, there is specified a predetermined reduction constant to be multiplied by the amount of the first charging information (free of charge when the constant is set to zero) or a reduction amount to be reduced from the amount of the first charging information. The charging condition of FIG. 5C is similar to that of FIG. 5A.

FIG. 6 shows structure of a signal transmitting apparatus in the satellite or CATV broadcasting station.

Referring now to FIG. 6, description will be given of operation to add charging information for a privileged condition to the commercial signal field.

In the satellite or CATV broadcasting station, commercial (CM) video information 36 and main video information 37 are selected via a switch 42, whereas CM audio information 34 and audio or voice information 35 is selected through a changed-over operation by a switch 41. The selected signals are fed to a scrambler 43 to be scrambled therein. The scrambled signal is fed to an adder 47. On the other hand, scramble condition data 38 fed via a gate circuit 45 and charging information 39 delivered through a gate circuit 46 are inputted to the adder 47 to be added to the scrambled signal. Timing of the adding operation of the adder 47 is controlled by a timing signal generated from a timing generator 44 according to a reference signal (e.g., a horizontal or vertical sync signal) of the video information 37. The change-over operation for the CM and charging information is accomplished by a signal to control the change-over between CM video and voice information generated from an input terminal 40 in response to an operation conducted by the user.

While the description has been described of an example of a satellite or CATV broadcasting station, the operation is similarly achieved when a videocassette tape or an optical disk is employed as the recording media. Namely, the operation can be accomplished by recording signals from the adder 47 on the media.

The privileged charge according to the second charging information is applied to the viewing of added commercial video images. The charging operation is conducted when the added charging information, namely, the second charging information flag is detected exceeding the predetermined number of times. Information of the number of times of detection is added together with the charging information.

Consequently, in the charging information decoder 8, only when charging information associated with the privilege is detected, a detection signal is produced each time the particular charge information is sensed. The signal is then outputted to the charging information detection count circuit 48 together with the predetermined number of times thus established.

In the circuit 48, the preset number of times and the sense signal are examined to recognize a condition that the charging information is detected more than the preset number of times. Information of the recognized condition is then outputted to the charge calculating circuit 9. In the calculating circuit 9, a charging condition is established according to the information of the charging condition from the charging information decoder 8 and the information of recognition from the charging information detection count circuit 48. In other words, when particular information such as information of commercials is continuously decoded for a preset period of time (i.e., the charging information is sensed more than the fixed number of times namely, a predetermined plural number of times), the charging amount is reduced or the information is supplied free of charge. In this connection, once the privileged amount is established, the charging condition may be kept unchanged until the pertinent program is replaced with a new program in the system. Or, the condition may be kept effective until the next privileged charge information is sensed. However, the amount of charge is reset each time a new program is loaded for execution thereof.

In the signals reproduced by the videotape recorder 28 or LDP 34, when a portion of particular information associated with commercials or the like to which the privileged charge information is added is skipped by, for example, a search operation, the privileged charge information cannot be detected more than the preset number of times and hence the privileged charge is not applied. Namely, there is employed the ordinary charging information added to the video information other than the particular information such as information of commercials.

In the charge calculating circuit 9, an amount of charge is calculated under the established charging condition according to information of time issued from the timer each time a preset fixed period of time lapses. The charged amount is delivered to the charge processing circuit 14. In this regard, the charge calculating circuit assumes that the quality of input signal is remarkably lowered and hence sets the free-of-charge condition when a signal indicating a high frequency of occurrences of errors is produced from the the error amount check circuit 32 for deciding that the amount of errors sensed by the descrambler 4 is equal to or more than a preset value or when a signal indicating the same condition is generated from the charging information error amount check circuit 33 for recognizing that the quantity of errors detected in the charging information sensed by the charging information decoder 8 is equal to or more than a predetermined value.

In the charge processing circuit 14, the account of the electronic money IC card 17 is settled via the IC card interface 16 for the charged amount created from the charge calculating circuit 9 (the charged amount is withdrawn from the total amount of the IC card 17). Since the settlement is conducted with the electronic money IC card 17, the charging process can be frequently accomplished at a fixed period of time without any additional cost required in conventional system.

Furthermore, in the circuit 14, the settled amount is remitted via the communication line 20 (e.g., a telephone line) to the charge collecting firm 21. Namely, information of remittance is communicated via the modem 15. Since the settlement is achieved with the IC card storing therein electronic money, the credit checking process and complex post-processing are unnecessary in the credit settlement. Additionally, by checking the balance of the IC card, it is possible to report a warning message or to stop the decoding operation when the balance is insufficient, thereby preventing a case in which the payment of charged amount is not carried out.

Moreover, the checking of the balance in the IC card makes it possible to conduct a settlement service with a credit card in place of the IC card only when the balance is insufficient in the IC card. The settlement service process is also executed through the bi-directional communication with the charge collecting firm 21.

FIG. 7 shows a specific example of circuit constitution including the charge information decoder 8, charge information detection count circuit 48, charge calculating circuit 9, charge processing circuit 14, and error amount check circuits 32 and 33 of FIG. 1.

In signal extracting circuits 81 to 84 of the charging information decoder 8, first charging information, second charging information, a second charging information use condition, and a second charging information flag are extracted from the signals of the header field 51 of the transmission signal.

The charging information detection count circuit 48 includes a counter 481 for conducting a counting operation each time the flag detecting circuit 84 senses a second charging information storage flag during a predetermined unitary time. A necessary flag detection count satisfying the second charging information use condition from the signal extraction circuit 83 is stored in a count setting circuit 482. When the obtained value of the counter 481 is equal to the value set to the count setting circuit 482, a signal specifying second charging information is created.

In the charge calculating circuit 9, a switch 91 selects in response to the second charging information specifying signal from the detection count circuit 48 the second charging information outputted from the signal extracting unit 82. When the specifying signal is missing, the switch 91 selects the first charging information from the signal extracting unit 81. An amount of charge per unitary time in the charging information selected by the switch circuit 91 is stored in a storage circuit 92. A period of time of operation (reproduction) conducted by the decoder 1 is measured by the timer 10 such that a timing signal is produced for each unitary charging period of time. In this connection, inputted to an OR gate 94 are signals generated from the error amount check circuits 32 and 33. If there exists either one of the input signals, there is produced an addition stop signal. In response thereto, an adder circuit interrupts an operation of adding amounts of charge to each other.

The charge processing circuit 14 includes a read/write circuit 141 capable of accessing a data area of the electronic money IC card 17 via the interface 16 and a charge collecting circuit 142 for withdrawing the charged amount outputted from the adder 93 from the balance in the data area of the money card 17.

The error amount check circuit 32 includes an error check circuit 321 for detecting errors in the transmission signal according to the CRC code in the header field 51, a coefficient circuit 322 for counting the amount of errors detected in the unitary period of time, and a decision circuit 323 for recognizing that the amount of errors is equal to a predetermined value and producing a signal indicating the pertinent condition.

The error amount check circuit 33 includes a parity check circuit 331 for detecting errors in the transmission signal according to the parity check code in the header field 51, a coefficient circuit 332 for counting the amount of errors per unitary time, and a decision circuit 333 for determining that the amount of errors is equal to a predetermined value and creating a signal designating the pertinent condition.

Incidentally, it is possible to select by an input changeover switch 6 either one of the signal from the satellite broadcasting tuner 24, the signal from the CATV tuner 26, the signal reproduced by LDP 34, and the signal reproduced by the videotape recorder 28. The selected signal is outputted via the record signal output circuit 7 together with the charging information and decoding information. The resultant signal is recorded in a recording apparatus such as the videotape recorder 28. When reproducing the recorded signals, the signals are inputted to the decoder section 1 of the set-top box to be similarly subjected to the descramble process as well as the charging process. In this regard, since a copy guard process is carried out for the signals delivered to the analog TV 18 and digital TV 19, it is impossible to record (copy) the signals onto another recording media.

In consequence, the charging operation for the copyright or the like can be advantageously achieved also for the copied information. The viewers can advantageously use the video information containing particular information such as commercial information at a lower price.

Figure 8:
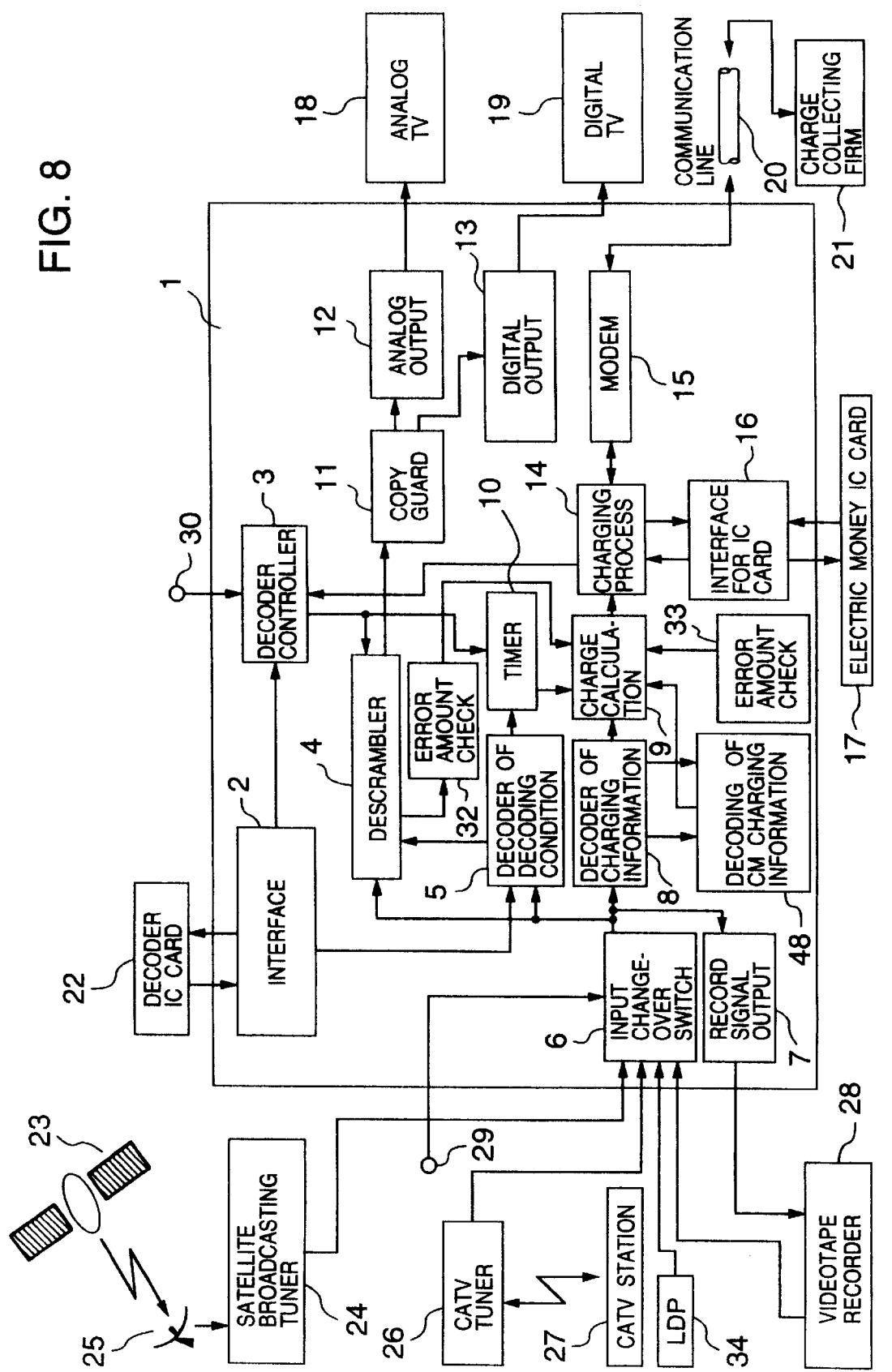
FIG. 8 is a block diagram showing another embodiment of a fee charging system for a video information according to the present invention.

Referring next to FIG. 8, description will be given of an alternative embodiment according to the present invention.

FIG. 8 shows another example of constitution of the fee charging system for video information according to the present invention. In this block diagram, the same constituent elements as those of FIG. 1 are assigned with the same reference numerals and description thereof will be unnecessary.

The decoder section 1 of the set-top box includes a charging information circuit 31 for sending the charged amount from the charge calculating circuit 9 to the charge collecting firm 21 and a CM charging information decoder 49 for extracting privileged charging information distributively arranged in the CM signal field.

In the charging system of the embodiment shown in FIG. 1, the same information signal is disposed as second charging information in the second video information (commercial information) at a fixed interval. Consequently, an amount of charge for a fixed period of time can be calculated by counting events of detection of the pertinent flag. In contrast therewith, charging information is distributively arranged in a plurality of charging signals according to the charging system of the embodiment shown in FIG. 8. That is, the second charging information is reproduced by collecting and combining with each other the predetermined charging signals thus distributed. In the embodiment of FIG. 8, to use information according to the second charging information of the particular charge, the user is required to view second video signals for a period of time in which at least the second charging information can be appropriately reproduced.

Next, description will be given of operation of the set-top box of FIG. 8. In this connection, since the primary operation thereof is almost the same as that of the embodiment shown in FIG. 1, the operational differences therebetween will be described.

Also in FIG. 8, charging information is added to video information at a predetermined interval as shown in FIG. 2. Additionally, when particular information such as CM information is added as shown in FIG. 2B, the charging information of privilege (to set a discounted price or to supply information free of charge) is added to the commercial signal field. However, as distinct from FIG. 1, the privileged charge information (to set a reduced price or to supply information free of charge) of the commercial signal field is distributively arranged in this field. Namely, to utilize the charging information related to privilege, the commercial signal field is required to be continuously decoded at least a preset period of time to gather the charging information distributed therein. In consequence, the charging information decoded by the charging information decoder 8 is fed to the CM charging information decoder 49 such that privileged charge information items distributed in the CM signal field are collected to be fed to the charge calculating circuit 9. Each privileged charge information item thus distributed includes, for example, an identifier indicating that this item contains privileged charge information and a number to reconstruct the original privileged charge information. There may be employed quite a simple method as follows. Namely, one bit is sequentially arranged as each particular charge information item added at a fixed interval.

Figure 9A:
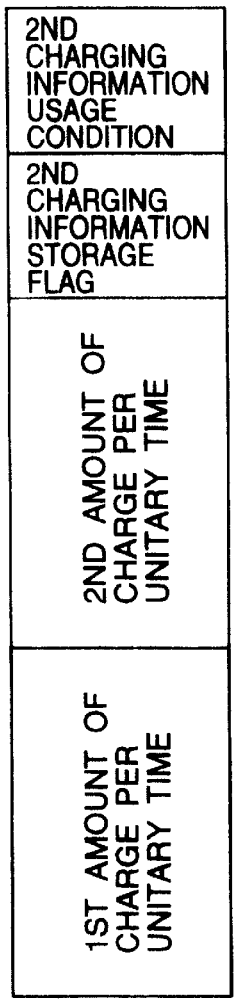
FIGS. 9A and 9B are diagrams showing an example of the contents of charging information in the embodiment of FIG. 8.
Figure 9B:
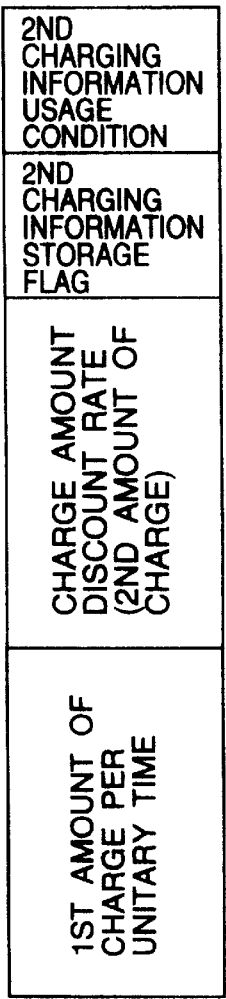

FIGS. 9A and 9B show examples of the distributed arrangement of second charging information.

FIG. 9A includes a charge data area indicating a first amount of charge per unitary (reproduction) time, a partial data area indicating partial data to calculate a second amount of charge, a flag denoting that a portion of second charging information is stored, and an area designating a condition under which the second charging information is applied to the charging operation.

FIG. 9B includes a charge data area in which a first amount of charge per unitary time is stored, a partial data area indicating a partial data to calculate a reduction constant for the amount of charge of first charging information, a flag designating that second charging information is stored, and an area indicating a condition under which the second charging information is employed.

Figure 10:
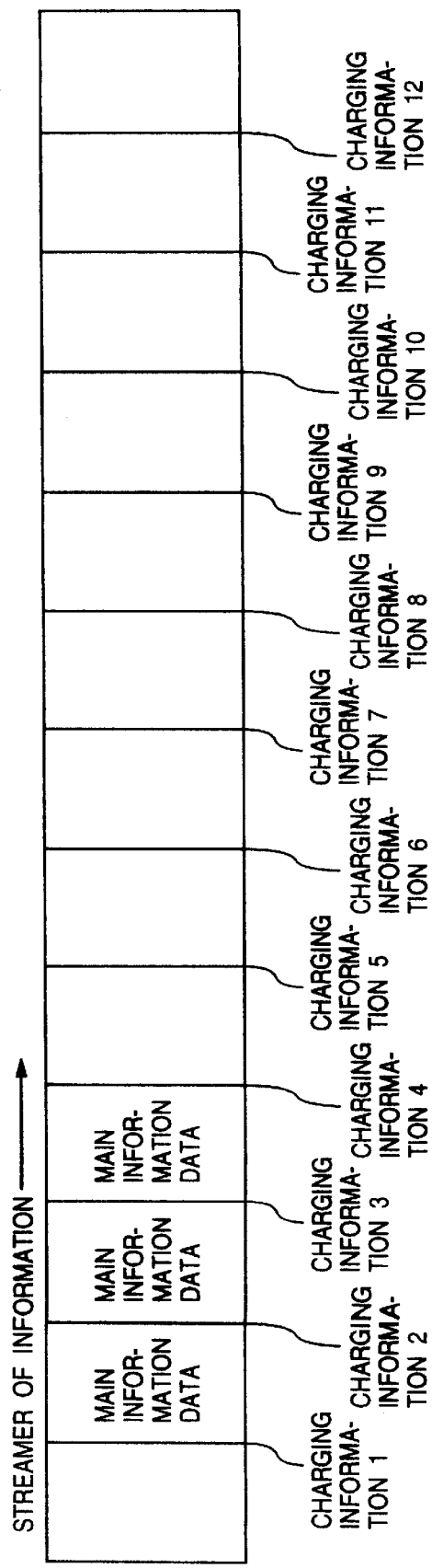
FIG. 10 is a diagram showing an example of distributed arrangement of charging information in the embodiment of FIG. 8.

The partial data items of second charging information are distributively arranged in the commercial field of the transmission signal. For example, the second charging information may be subdivided into 13 partial charging information items to be disposed in the transmission signal as shown in FIG. 10.

Figure 11:
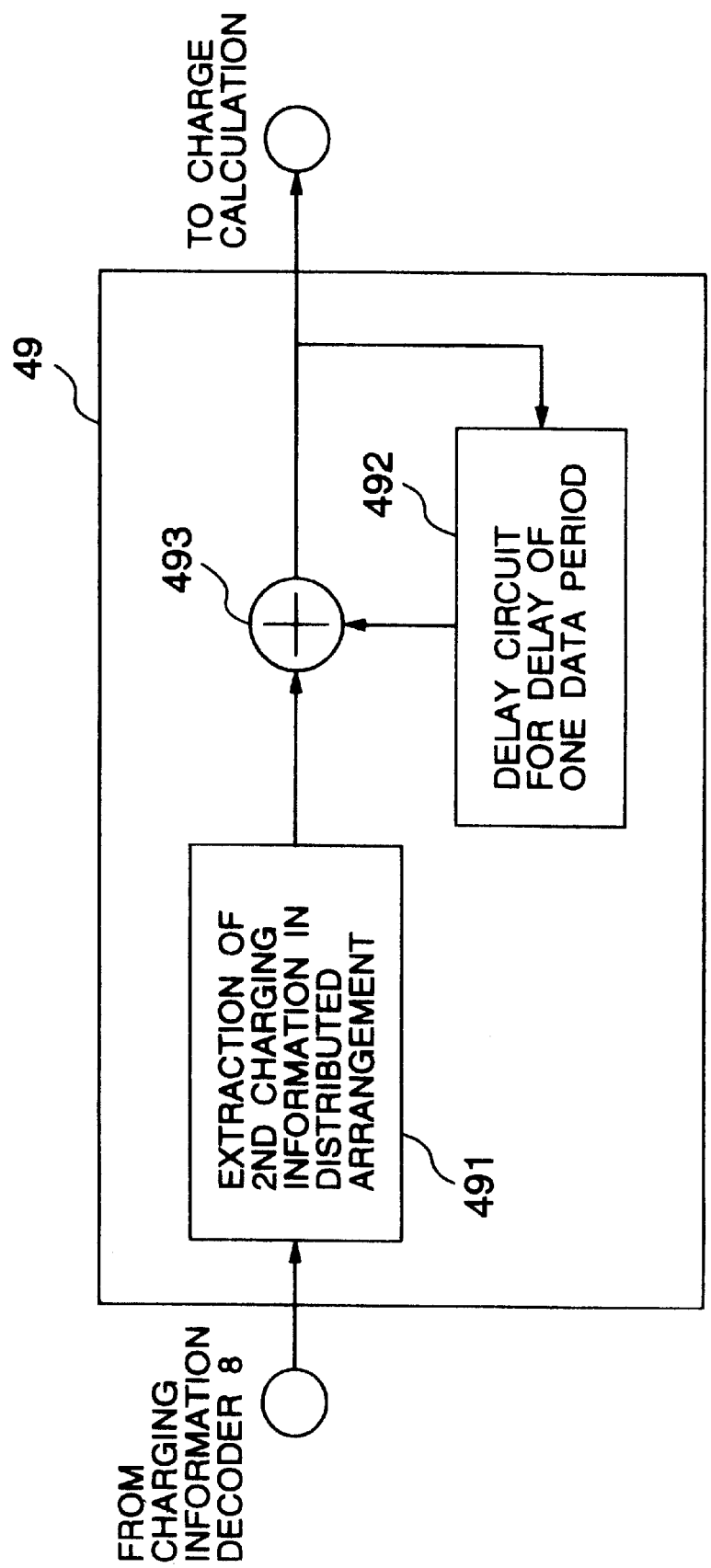
FIG. 11 is a block diagram showing a concrete example of constitution of an encoder circuit of commercial charging information in the embodiment of FIG. 8.

In the reproduction of a video signal, 13 charging information items are gathered to be restored to the complete second charging information by the CM charging information decoder 49. FIG. 11 shows a specific example of the decoder 49. Partial second charging information items outputted from the charging information decoder 8 are sequentially accumulated by a delay circuit 492 and an adder circuit 493 until the 13 partial information items are completely collected.

In the charge calculating circuit 9, a charging condition is set according to charging condition information from the charging information decoder 8 and privileged charge information from the CM charging information decoder 49. In other words, when particular information such as commercial information is successively decoded for a preset period of time (i.e., when the charging information items distributively arranged in the CM signal field are reconstructed to the charging information), the charging condition is set to reduce the amount of charge or to supply information free of charge. In the charge calculating circuit 9, an amount of charge is calculated at a predetermined interval of time under the established charging condition according to information of time from the timer, thereby outputting the amount of charge to the charging information circuit 31.

In this connection, when a signal designating a large amount of errors is outputted from the error check circuit 32 which decides that the amount of errors detected by the descrambler 4 is equal to or more than a predetermined value or when a signal similarly denoting a large quantity of errors is produced from the charging information error check circuit 33 which recognizes that the amount of errors sensed by the charging information decoder circuit 8 becomes equal to or more than a preset value, the charge calculating circuit 9 assumes that the quality of input signals is considerably deteriorated and hence decides that the information is supplied free of charge. Thanks to this operation, when the quality of information copied onto, for example, a videotape is lowered due to deterioration in quality of the tape (i.e., when there appear too many errors to descramble transmission signals), the charging operation is practically not achieved. It is accordingly possible to prevent the event in which the user is charged for information not actually acquired.

In the charging information circuit 14, the amount of charge is sent via the communication line 20 such as a telephone line to the charge collecting firm 21. For this purpose, the remittance of the charged amount is accomplished via the modem 15.

In the amount remitting process, an ID number received from the decoder IC card 22 is transmitted together with the charged amount. In case where the transmission process with the charge collecting firm 21 via the communication line 20, e.g., a telephone line is unsuccessful or the credit card associated with the settlement of the charged amount is unacceptable due to expiration of the time limit, the decoder controller 3 may be controlled by a signal outputted from the charging information circuit 14 to thereby stop the operation of the descrambler 4.

Incidentally, it is possible that either one of the signal from the satellite broadcasting tuner 24, the signal from the CATV tuner 26, the reproduced signal from the LDP 34, and the reproduced signal from the videotape recorder 28 is selected to be sent together with charging information and decode information via the record signal output circuit 7 so as to be recorded in a recording apparatus such as the videotape recorder 28. In the reproduction of the signal recorded in this fashion, the signal is fed to the decoder section 1 of the set-top box to undergo the descramble and charging processes.

In consequence, there is attained a merit that the charging process related to the copyright or the like can also be accomplished for the copied information. Moreover, the user can advantageously acquire at a lower price the video information to which particular information such as commercial information is added.

According to the present invention, there are further obtained advantages as follows.

1. Particular information associated with commercials or the like is supplied together with video information to provide the following service. When the user successively views the particular information related to commercials for a period of time satisfying a predetermined condition, there can be employed a privileged amount of charge (e.g., the amount of charge is reduced or information is supplied free of charge). This leads to an advantage that the user can acquire information at a lower price.

2. The copied information includes scrambled signals, and the decode information and charging information are also copied. Consequently, to reproduce and view the copied information, the descramble and charging processes are necessitated. As a result, the charging operation is carried out while protecting the copyright and the like. Furthermore, since the charging operation is executed for each copying operation of the same information, it is possible to lower the amount of charge per copy. Resultantly, the user can advantageously obtain information at a lower price.

3. Since the charged amount can be settled with an IC card storing therein electronic money, it is possible to avoid the credit check for settlement with a credit card and the complicated post-processing for the settlement of the charged amount. Additionally, the undesired event in which the charged amount is kept unsettled can be prevented. Moreover, the credit card may also be utilized.

In addition, even when there is accomplished a service in which, for example, the charging process is conducted at a predetermined interval of time, the settlement of the charged amount can be carried out only by communicating with the IC card. Namely, the service can be provided practically without increasing the overall cost for the information service.

4. Recognizing the amount of errors in input signals, the charging process can be effected according to the quality of the input signals (e.g., the information may be supplied free of charge when the quantity of errors exceeds a preset value). With this provision, when the quality of information attained through a copying operation is deteriorated, the charging process is not executed. Namely, it is possible to avoid the event in which the user is charged for information not acquired.

5. There may be introduced methods of determining privileged charging information as follows. For example, when privileged charging information is detected exceeding a predetermined number of times, the privileged amount of charge is employed. Or, privileged charging information is distributively arranged in the commercial signal field to later recognize in the viewing of the pertinent information the period of time in which the information is used by the user. When particular information including commercial information is viewed at least a preset period of time, the privileged amount of charge is applied to the user.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for charging a fee for a video information, comprising:

a recording and reproducing circuit which records scrambled signals including a main video information with a first charging information and an auxiliary video information with a second charging information, having a different charging level from that of the first charging information, on a recording medium and reproducing the scrambled signals from said recording medium;

a descrambler which descrambles the scrambled signals reproduced by said recording and reproducing circuit so as to reproduce original unscrambled video information; and a detector which detects the charging information in the scrambled signals reproduced from said recording medium, wherein a first fee based on said first charging information is charged each time the original unscrambled main video information is reproduced from the recorded scrambled signals, and a second, different fee based on said second charging information is charged each time both of the original unscrambled main and auxiliary video information are reproduced from the recorded scrambled signals.

2. A system for charging a fee for a video information, comprising:

a video information output circuit which outputs therefrom a video signal including first video information and second video information, wherein the first video information is main video information and the second video information is auxiliary video information;

an adding circuit which adds first charging information to the first video information from the video information output circuit and which adds second charging information, other than the first charging information, to the second video information;

a scrambler which scrambles said video signal which has had the first or second charging information added thereto and which transmits the scrambled signal;

a reproducing circuit which receives the scrambled signal and selectively reproduces the first and second video information and the first and second charging information, respectively, from said scrambled signal; and a charging circuit which charges a first fee based on said first charging information each time the original unscrambled main video information is reproduced from the recorded scrambled signals, and a second, different fee based on said second charging information each time both of the original unscrambled main and auxiliary video information are reproduced from the recorded scrambled signals.

3. A system according to claim 1, further comprising a fee settling arrangement including:
   an interface to which an IC card as a storage of electronic money is connected; and
   a charge circuit which withdraws a fee amount on the basis of the charging information from the IC card keeping therein the electronic money each time the original unscrambled main and/or auxiliary video information are reproduced from the recorded scrambled signals.

4. A system according to claim 1, further including:
   an error detector which detects errors in the reproduced information and provides an error signal when the quantity of the detected errors exceeds a predetermined value; and
   a charge circuit which charges the first or second charging condition in response to the error signal.

5. A system according to claim 1, further including:
   an error detector which detects errors in the reproduced signal and provides an error signal when the quantity of the detected errors exceeds a predetermined value; and
   a charge circuit which invalidates a charging process in response to the error signal.

6. A system according to claim 2, wherein said charging circuit charges a first fee based on said first charging information each time the original unscrambled main video information is reproduced from the recorded scrambled signals without reproducing said auxiliary video information.

7. A method for charging a fee for a video information, comprising:
   recording scrambled signals including a main video information with a first charging information and an auxiliary video information with a second charging information, having a different charging level from that of the first charging information, on a recording medium and reproducing the scrambled signals from said recording medium;
   descrambling the scrambled signals reproduced by said recording and reproducing steps so as to reproduce original unscrambled video information; and
   detecting the charged information in the scrambled signals reproduced from said recording medium,
   wherein a first fee based on said first charging information is charged each time the original unscrambled main video information is reproduced from the recorded scrambled signals, and a second, different fee based on said second charging information is charged each time both of the original unscrambled main and auxiliary video information are reproduced from the recorded scrambled signals.

8. A method for charging a fee for a video information, comprising:
   outputting from a video information output means a video signal including first video information and second video information wherein the first video information is main video information and the second video information is auxiliary video information;
   adding first charging information to the first video information from the video information output means and adding second charging information, other than the first charging information, to the second video information;
   scrambling said video signal which has had the first or second charging information added thereto and transmitting the scrambled signal;
   receiving the scrambled signal and selectively reproducing the first and second video information and the first and second charging information, respectively, from said scrambled signal; and
   charging a first fee based on said first charging information each time the original unscrambled main video information is reproduced from the recorded scrambled signals, or a second, different fee based on said second charging information each time both of the original unscrambled main and auxiliary video informations are reproduced from the recorded scrambled signals.

9. A system according to claim 8, wherein said charging circuit charges a first fee based on said first charging information each time the original unscrambled main video information is reproduced from the recorded scrambled signals without reproducing said auxiliary video information.

10. A device for charging a fee for video information, comprising:
    an input circuit which inputs a main video information signal, advertising information, a first charging information signal which indicates a first fee for reproducing said main video information signal, and a second charging information signal which indicates a second fee for reproducing said main video information signal with said advertising information, said second fee being different from said first fee;
    a reproducing circuit which reproduces said main video information signal and both said main video information signal and said advertising information; and
    a charge calculator which calculates a fee based on said first charging information signal when said main video information signal is reproduced, and calculates a fee based on said second charging information signal when both said main video information signal and said advertising information are reproduced.

11. A device for charging a fee for video information according to claim 10,
    wherein said main video information signal, said advertising information, said first charging information signal and said second charging information signal are scrambled,
    said device further comprising a descrambler which descrambles said advertising information, said first charging information signal and said second charging information signal.

12. A device for charging a fee for video information according to claim 10, further comprising:
    an error detector which detects an error in reproduced information and generates an error signal when the quantity of the detected error exceeds a predetermined value,
    wherein said charge calculator changes a charging condition in response to said error signal, and said main video information is reproduced even when an error signal is generated.

13. A device for charging a fee for video information according to claim 12, wherein said charge calculator invalidates a charging process in response to said error signal.

14. A device for charging a fee for video information according to claim 10, further comprising:
    a detector which detects reproducing amount of said advertising information,
    wherein said charge calculator calculates a fee based on said second charging information signal when said detector detects that a reproducing amount of said advertising information exceeds a predetermined value.

15. A device for charging a fee for video information according to claim 10, wherein said first charge information indicates a first amount of charge per unitary time and said second charge information indicates a second amount of charge per unitary time.

16. A device for charging fee for video information according to claim 10, wherein said first charging information signal is distributed in said main video information signal, and said second charging information signal is distributed in said advertising information, said charge calculator calculates a fee based on accumulated distribution of said second charging information signal.

17. A device for charging a fee for video information according to claim 10, further comprising:
a recording circuit which records said main video information signal, said advertising information, said first charging information signal and said second charging information signal on a medium.

18. A device for charging a fee for video information according to claim 10, further comprising:
a charging process circuit which processes an IC card storing an electric money; and
a communication circuit which sends an electric money corresponding to a fee to a center.

19. A device for charging a fee for video information according to claim 10, wherein said input circuit includes a receiver which receives transmitted said main video information signal, transmitted said advertising information, transmitted said first charging information signal and transmitted said second charging information signal.

20. A device for charging a fee for video information according to claim 10, wherein said input circuit includes a reader which reads said main video information signal, transmitted said advertising information, transmitted said first charging information signal and transmitted said second charging information signal from a medium.

21. A device for charging a fee for video information according to claim 10, wherein said advertising information is in said main video information.

22. A device for charging a fee for video information according to claim 10, wherein said advertising information is inserted before, after or in said main video information.

23. A device for charging a fee for video information according to claim 10, wherein two kinds of fees, which include said first fee and said second fee, are set up to reproduce same main video information.

24. A system for charging a fee for video information, comprising:
a transmitter which transmits a main video information signal, advertising information, a first charging information signal which indicates a first fee for reproducing said main video information signal, and a second charging information signal which indicates a second fee for reproducing both said main video information signal and said commercial information signal, said second fee being different from said first fee;
a receiver which receives said main video information signal, said advertising information, said first charging information signal and said second charging information signal;
a reproducing circuit which reproduces said main video information signal and both said main video information signal and said advertising information; and
a charge calculator which calculates a fee based on said first charging information signal when said main video information signal is reproduced, and calculates a fee based on said second charging information signal when both said main video information signal and said advertising information are reproduced.

25. A system for charging a fee for video information according to claim 24, further comprising:
a scrambler which scrambles said main video information signal, said advertising information, said first charging information signal and said second charging information signal before transmitting thereof; and
a descrambler which descrambles received said advertising information, said first charging information signal and said second charging information signal.

26. A system for charging a fee for video information according to claim 24, further comprising:
an error detector which detects an error in reproduced information and generates an error signal when quantity of the detected error exceeds a predetermined value,
wherein said charge calculator changes a charging condition in response to said error signal, and said main video information signal is reproduced even when an error signal is generated.

27. A system for charging a fee for video information according to claim 26,
wherein said charge calculator invalidates a charging process in response to said error signal.

28. A system for charging a fee for video information according to claim 24, further comprising:
a detector which detects reproducing amount of said advertising information,
wherein said charge calculator calculates a fee based on said second charging information signal when said detector detects that a reproducing amount of said advertising information exceeds a predetermined value.

29. A system for charging a fee for video information according to claim 24, wherein said first charge information indicates a first amount of charge per unitary time and said second charge information indicates a second amount of charge per unitary time.

30. A system for charging a fee for video information according to claim 24, wherein said first charging information signal is distributed in said main video information signal, and said second charging information signal is distributed in said advertising information, said charge calculator calculates a fee based on accumulated distribution of said second charging information signal.

31. A system for charging a fee for video information according to claim 24, further comprising:
a recording circuit which records said main video information signal, said advertising information, said first charging information signal and said second charging information signal on a medium.

32. A device for charging a fee for video information according to claim 24, further comprising:
a charging process circuit which processes an IC card storing an electric money;
a communication circuit which sends an electric money corresponding to a fee; and
a charge collecting firm which receives said electric money sent from said communication circuit.

33. A system for charging a fee for video information according to claim 24, wherein said advertising information is in said main video information.

34. A system for charging a fee for video information according to claim 24, wherein said advertising information is inserted before, after or in said main video information.

35. A system for charging a fee for video information according to claim 24, wherein two kinds of fees, which include said first fee and said second fee, are set up to reproduce same main video information.

36. A device for charging a fee for video information, comprising:
   an input circuit which inputs a main video information signal, advertising information, a first charging information signal which indicates a first fee for reproducing said main video information signal, and a second charging information signal which indicates discount information on said first fee;
   a reproducing circuit which reproduces said main video information signal and both said main video information signal and said advertising information; and
   a charge calculator which calculates a fee based on said first charging information signal when said main video information signal is reproduced and a fee based on both said first charging information signal and said second charging information signal when both said main video information signal and said advertising information are reproduced.

37. A device for charging a fee for video information according to claim 36, wherein said second charging information signal indicates a discount rate on said first fee, and said charge calculator calculates a fee based on both first and second charging information signal.

38. A device for charging a fee for video information according to claim 36, wherein said second charging information signal indicates a discount fee on said first fee, and said charge calculator calculates a unique fee by subtracting said second fee from said first fee.

39. A device for,charging a fee for video information according to claim 36,
   wherein said main video information signal, said advertising information, said first charging information signal and said second charging information signal are scrambled,
   said device further comprising a descrambler which descrambles said advertising information, said first charging information signal and said second charging information signal.

40. A device for charging a fee for video information according to claim 36, further comprising:
   an error detector which detects an error in reproduced information and generates an error signal when the quantity of the detected error exceeds a predetermined value,
   wherein said charge calculator changes a charging condition in response to said error signal, and said main video information signal is reproduced even when an error signal is generated.

41. A device for charging a fee for video information according to claim 40, wherein said charge calculator invalidates a charging process in response to said error signal.

42. A device for charging a fee for video information according to claim 36, further comprising:
   a detector which detects a reproducing amount of said advertising information,
   wherein said charge calculator calculates a second fee based on said second charging information signal when said detector detects that said reproducing amount of said advertising information exceeds a predetermined value.

43. A device for charging a fee for video information according to claim 36, wherein said first charge information indicates a first amount of charge per unitary time and said second charge information indicates a second discount information per unitary time.

44. A device for charging a fee for video information according to claim 36, wherein said first charging information signal is distributed in said main video information signal and said second charging information signal is distributed in said advertising information, said charge calculator calculates a second fee based on accumulated distribution of said second charging information signal.

45. A device for charging a fee for video information according to claim 36, further comprising:
   a recording circuit which records said main video information signal, said advertising information, said first charging information signal and said second charging information signal on a medium.

46. A device for charging a fee for video information according to claim 36, further comprising:
   a charging process circuit which processes an IC card storing an electric money; and
   a communication circuit which sends an electric money corresponding to a fee to a center.

47. A device for charging a fee for video information according to claim 36, wherein said input circuit includes a receiver which receives transmitted said main video information signal, transmitted said advertising information, transmitted said first charging information signal and transmitted said second charging information signal.

48. A device for charging a fee for video information according to claim 36, wherein said input circuit includes a reader which reads said main video information signal, transmitted said advertising information, transmitted said first charging information signal and transmitted said second charging information signal from a medium.

49. A device for charging a fee for video information according to claim 36, wherein said advertising information is in said main video information.

50. A device for charging a fee for video information according to claim 36, wherein said advertising information is inserted before, after or in said main video information.

51. A system for charging a fee for video information, comprising:
   a transmitter which transmits a main video information signal, advertising information, a first charging information signal which indicates a first fee for reproducing said main video information signal, and a second charging information signal which indicates discount information on said first fee;
   a reproducing circuit which reproduces said main video information signal and both said main video information signal and said advertising information; and
   a charge calculator which calculates a fee based on said first charging information signal when said main video information signal is reproduced, and calculates a fee based on both said first charging information signal and said second charging information signal when both said main video information signal and said advertising information are reproduced.

52. A system for charging a fee for video information according to claim 51, wherein said second charging information signal indicates a discount rate on said first fee, and said charge calculator calculates a fee based on both first and second charging information signal.

53. A system for charging a fee for video information according to claim 51, wherein said second charging information signal indicates a discount fee on said first fee, and said charge calculator calculates a unique fee by subtracting said second fee from said first fee.

54. A system for charging a fee for video information according to claim 51, further comprising:
a scrambler which scrambles said main video information signal, said advertising information, said first charging information signal and said second charging information signal before transmitting thereof; and
a descrambler which descrambles received said advertising information, said first charging information signal and said second charging information signal.

55. A system for charging a fee for video information according to claim 51, further comprising:
an error detector which detects an error in reproduced information and generates an error signal when quantity of the detected error exceeds a predetermined value,
wherein said charge calculator changes a charging condition in response to said error signal, and said main video information signal is reproduced even when an error signal is generated.

56. A system for charging a fee for video information according to claim 55, wherein said charge calculator invalidates a charging process in response to said error signal.

57. A system for charging a fee for video information according to claim 51, further comprising:
a detector which detects a reproducing amount of said advertising information,
wherein said charge calculator calculates a second fee based on said second charging information signal when said detector detects that said reproducing amount of said advertising information exceeds a predetermined value.

58. A system for charging a fee for video information according to claim 51, wherein said first charge information indicates a first amount of charge per unitary time and said second charge information indicates a second discount information per unitary time.

59. A system for charging a fee for video information according to claim 51, wherein said first charging information signal is distributed in said main video information signal and said second charging information signal is distributed in said advertising information, said charge calculator calculates a second fee based on accumulated distribution of said second charging information signal.

60. A system for charging a fee for video information according to claim 51, further comprising:
a recording circuit which records said main video information signal, said advertising information, said first charging information signal and said second charging information signal on a medium.

61. A device for charging a fee for video information according to claim 51, further comprising:
a charging process circuit which processes an IC card storing an electric money;
a communication circuit which sends an electric money corresponding to a fee; and
a charge collecting firm which receives said electric money sent from said communication circuit.

62. A system for charging a fee for video information according to claim 51, wherein said advertising information is in said main video information.

63. A system for charging a fee for video information according to claim 51, wherein said advertising information is inserted before, after or in said main video information.

64. A method for charging a fee for video information, comprising:
inputting a main video information signal, advertising information, a first charging information signal which indicates a first fee for reproducing said main video information signal, and a second charging information signal which indicates a second fee for reproducing said main video information signal with said advertising information, said second fee being different from said first fee;
reproducing said main video information signal and both said main video information signal and said advertising information; and
calculating a fee based on said first charging information signal when said main video information signal is reproduced, and calculating a fee based on said second charging information signal when both said main video information signal and said advertising information are reproduced.

65. A method according to claim 64, further comprising:
detecting an error in reproduced information and generating an error signal when the quantity of the detected error exceeds a predetermined value,
wherein a charging condition associated with the fee calculation changes in response to said error signal, and said main video information signal is reproduced even when an error signal is generated.

66. A method according to claim 64, wherein two kinds of fees, which include said first fee and said second fee, are set up to reproduce same main video information.

67. A method for charging a fee for video information, comprising:
transmitting a main video information signal, advertising information, a first charging information signal which indicates a first fee for reproducing said main video information signal, and a second charging information signal which indicates a second fee for reproducing both said main video information signal and said advertising information, said second fee being different from said first fee;
receiving said main video information signal, said advertising information, said first charging information signal and said second charging information signal;
reproducing said main video information signal and both said main video information signal and said advertising information; and
calculating a fee based on said first charging information signal when said main video information signal is reproduced, and calculating a fee based on said second charging information signal when both said main video information signal and said advertising information are reproduced.

68. A method according to claim 67, further comprising:
detecting an error in reproduced information and generating an error signal when the quantity of the detected error exceeds a predetermined value,
wherein a charging condition associated with the fee calculation changes in response to said error signal, and said main video information signal is reproduced even when an error signal is generated.

69. A method according to claim 67,
wherein two kinds of fees, which include said first fee and said second fee, are set up to reproduce same main video information.

70. A method for charging a fee for video information, comprising:

inputting a main video information signal, advertising information, a first charging information signal which indicates a first fee for reproducing said main video information signal, and a second charging information signal which indicates discount information on said first fee;

reproducing said main video information signal and both said main video information signal and said advertising information; and calculating a fee based on said first charging information signal when said main video information signal is reproduced and a fee based on both said first charging information signal and said second charging information signal when both said main video information signal and said advertising information are reproduced.

71. A method according to claim 70, further comprising:

detecting an error in reproduced information and generating an error signal when the quantity of the detected error exceeds a predetermined value, wherein a charging condition associated with the fee calculation changes in response to said error signal, and said main video information signal is reproduced even when an error signal is generated.

72. A method for charging a fee for video information, comprising:

transmitting a main video information signal, advertising information, a first charging information signal which indicates a first fee for reproducing said main video information signal, and a second charging information signal which indicates discount information on said first fee;

reproducing said main video information signal and both said main video information signal and said advertising information; and calculating a fee based on said first charging information signal when said main video information signal is reproduced, and calculating a fee based on both said first charging information signal and said second charging information signal when both said main video information signal and said advertising information are reproduced.

73. A method according to claim 72, further comprising:

detecting an error in reproduced information and generating an error signal when the quantity of the detected error exceeds a predetermined value, wherein a charging condition associated with the fee calculation changes in response to said error signal, and said main video information signal is reproduced even when an error signal is generated.

* * * * *